US010063928B2

(12) United States Patent
Jaini et al.

(10) Patent No.: US 10,063,928 B2
(45) Date of Patent: *Aug. 28, 2018

(54) METHODS, SYSTEMS, AND MEDIA FOR CONTROLLING A PRESENTATION OF MEDIA CONTENT

(71) Applicant: Google LLC, Mountain View, CA (US)

(72) Inventors: Shiva Jaini, Santa Clara, CA (US); Kevin Dame, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,112

(22) Filed: Jun. 27, 2016

(65) Prior Publication Data

US 2016/0309231 A1 Oct. 20, 2016

Related U.S. Application Data

(63) Continuation of application No. 14/868,217, filed on Sep. 28, 2015, now Pat. No. 9,398,334, which is a
(Continued)

(51) Int. Cl.
*H04N 21/475* (2011.01)
*H04N 21/442* (2011.01)
(Continued)

(52) U.S. Cl.
CPC ......... *H04N 21/4751* (2013.01); *G06T 13/40* (2013.01); *H04N 21/25891* (2013.01);
(Continued)

(58) Field of Classification Search
CPC ............ H04N 21/4571; H04N 21/475; H04N 21/4751; H04N 21/441; H04N 21/44204; H04N 21/44222
See application file for complete search history.

(56) References Cited

U.S. PATENT DOCUMENTS 5,168,372 A * 12/1992 Sweetser ............. G04G 15/006
348/E7.055
6,163,316 A * 12/2000 Killian ............... H04N 5/44543
348/553
(Continued)

FOREIGN PATENT DOCUMENTS

WO WO/2013/096944 6/2013

OTHER PUBLICATIONS

"Xbox 360 Family Timer", last updated Oct. 22, 2013, pp. 1, available at: www.getgamesmart.com/tools/guide/familytimer/.
(Continued)

*Primary Examiner* — Robert J Hance
(74) *Attorney, Agent, or Firm* — Byrne Poh LLP

(57) ABSTRACT

Systems, methods, and media for controlling a presentation of media content are provided. In accordance with some embodiments, methods for controlling a presentation of media content, the methods comprising: causing the presentation of the media content to begin; measuring an elapsed time of the presentation of the media content; determining a first threshold based on at least one of: a characteristic of a person; a characteristic of a current point in time; and a characteristic of the media content; determining if the elapsed time of the presentation has met the first threshold; and ending the presentation in response to determining that the elapsed time of the presentation has met the first threshold.

21 Claims, 10 Drawing Sheets

Related U.S. Application Data continuation of application No. 14/080,307, filed on Nov. 14, 2013, now Pat. No. 9,148,698.

(51) Int. Cl.

| | | |
|---|---|---|
| *H04N 21/441* | (2011.01) | |
| *H04N 21/258* | (2011.01) | |
| *H04N 21/454* | (2011.01) | |
| *H04N 21/488* | (2011.01) | |
| *H04N 21/658* | (2011.01) | |
| *H04N 21/45* | (2011.01) | |
| *H04N 21/462* | (2011.01) | |
| *H04N 21/81* | (2011.01) | |
| *G06T 13/40* | (2011.01) | |

(52) U.S. Cl.
CPC ..... *H04N 21/441* (2013.01); *H04N 21/44204* (2013.01); *H04N 21/44222* (2013.01); *H04N 21/4532* (2013.01); *H04N 21/4542* (2013.01); *H04N 21/462* (2013.01); *H04N 21/475* (2013.01); *H04N 21/4755* (2013.01); *H04N 21/4882* (2013.01); *H04N 21/6582* (2013.01); *H04N 21/8106* (2013.01); *H04N 21/8146* (2013.01)

(56) References Cited

U.S. PATENT DOCUMENTS

| | | | | |
|---|---|---|---|---|
| 6,564,005 B1* | 5/2003 | Berstis | ............... | H04N 5/44543 348/E5.105 |
| 7,055,041 B1* | 5/2006 | Hansmann | ............. | H04N 7/163 348/E7.061 |
| 7,921,440 B1* | 4/2011 | Kolde | ................ | H04N 21/4263 348/460 |
| 2003/0145322 A1* | 7/2003 | Song | .................... | G04G 15/006 725/26 |
| 2004/0060059 A1 | 3/2004 | Cohen | | |
| 2004/0143838 A1* | 7/2004 | Rose | ...................... | H04N 7/163 725/25 |
| 2004/0143839 A1* | 7/2004 | Gonzales-Caiazzo | ............. | H04N 5/44513 725/29 |
| 2004/0221303 A1* | 11/2004 | Sie | .......... | G06Q 30/02 725/29 |
| 2007/0174867 A1* | 7/2007 | Dunning | ............ | H04N 7/17318 725/30 |
| 2008/0077950 A1* | 3/2008 | Burke | ................ | H04N 7/17318 725/1 |
| 2009/0328086 A1* | 12/2009 | Yanagimoto | ......... | H04N 5/4401 725/9 |
| 2013/0212618 A1* | 8/2013 | Schultz | ................... | G06F 21/10 725/30 |

OTHER PUBLICATIONS

Notice of Allowance dated May 27, 2015 in U.S. Appl. No. 14/080,307.

Office Action dated Aug. 29, 2014 in U.S. Appl. No. 14/080,307.

Office Action dated Dec. 3, 2015 in U.S. Appl. No. 14/868,217.

Sprey, K., "GameDr Video Game Timer Limits Kids' Gaming Time", last updated May 3, 2009, pp. 1-2, available at: www.gizmag.com/gamedr-video-game-timer/11595/.

Notice of Allowance dated Mar. 21, 2016 in U.S. Appl. No. 14/868,217.

\* cited by examiner

METHODS, SYSTEMS, AND MEDIA FOR CONTROLLING A PRESENTATION OF MEDIA CONTENT

CROSS-REFERENCE TO RELATED APPLICATIONS

This application is a continuation of U.S. patent application Ser. No. 14/868,217, filed Sep. 28, 2015, which is a continuation of U.S. patent application Ser. No. 14/080,307, filed on Nov. 14, 2013, which are hereby incorporated by reference herein in their entireties.

TECHNICAL FIELD

The present invention relates to systems, methods, and media for controlling a presentation of media content.

BACKGROUND

Many children enjoy viewing media content such as videos, movies, and television programs. Furthermore, with the proliferation of mobile devices such as tablets, mobile phones, and laptops, it can be easy for children to access media content. In many situations, children can access media content without the help or the supervision of their parents.

However, continuous or unlimited watching of media content can have negative consequences. For this reason, many parents have time limits on "screen time" for their children.

Despite having limits on "screen time," many parents can find it difficult to enforce the limits. First, it can be difficult to keep track of limits. For example, a child viewing a movie on a tablet may take the tablet out of view of the parent, which can make it difficult for the parent to remember to enforce the time limit. Second, parents can find it emotionally difficult to enforce time limits, as suddenly stopping a movie or television program can cause their children to cry, get angry, or be otherwise upset. In such situations, some parents may not want to be seen as "the bad guy."

Accordingly, it is desirable to provide new systems, methods, and media for controlling a presentation of media content.

SUMMARY

Systems, methods, and media for controlling a presentation of media content are provided. In accordance with some embodiments, methods for controlling a presentation of media content are provided, the methods comprising: causing the presentation of the media content to begin; measuring an elapsed time of the presentation of the media content; determining a first threshold based on at least one of: a characteristic of a person; a characteristic of a current point in time; and a characteristic of the media content; determining if the elapsed time of the presentation has met the first threshold; and ending the presentation in response to determining that the elapsed time of the presentation has met the first threshold.

In accordance with some embodiments of the disclosed subject matter, systems for controlling a presentation of media content are provided, the systems comprising: a hardware processor that is configured to: cause the presentation of the media content to begin; measure an elapsed time of the presentation of the media content; determine a first threshold based on at least one of: a characteristic of a person; a characteristic of a current point in time; and a characteristic of the media content; determine if the elapsed time of the presentation has met the first threshold; and end the presentation in response to determining that the elapsed time of the presentation has met the first threshold.

In accordance with some embodiments of the disclosed subject matter, non-transitory computer-readable media containing computer executable instructions that, when executed by a processor, cause the processor to perform a method for controlling a presentation of media content are provided, the method comprising: causing the presentation of the media content to begin; measuring an elapsed time of the presentation of the media content; determining a first threshold based on at least one of: a characteristic of a person; a characteristic of a current point in time; and a characteristic of the media content; determining if the elapsed time of the presentation has met the first threshold; and ending the presentation in response to determining that the elapsed time of the presentation has met the first threshold.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Systems, methods, and media for controlling a presentation of media content are provided.

In accordance with some embodiments, mechanisms, which can be systems, methods and/or media, are provided for creating, saving, modifying, and using time-based controls for media content viewing. Such time-based controls may control when and for how long a user can access media content, may issue a warning when access is about to be stopped, and may automatically stop access when a time limit has been reached. In some such embodiments, warnings can be delivered by a child-friendly character. In some such embodiments, a presentation of media content can be limited or stopped with a message from a child-friendly character.

In some embodiments, time-based controls for media content viewing can be created, saved, modified, and used on various user devices, including mobile phones, tablet computers, laptop or desktop computers, gaming systems, smart televisions, set-top boxes, streaming media devices, etc.

In accordance with some embodiments, the mechanisms can include allowing a user to personalize time-based control options (e.g., time duration, frequency of media content viewing, etc.). In some such embodiments, the options can be saved in one or more "profiles." In some embodiments, profiles can be stored on and loaded from a profile information server. In some embodiments, profiles can be stored on a user device in memory and/or storage.

In accordance with some embodiments, time-based controls for media content viewing can apply to any suitable type of media content. For example, time-based controls can be applied to videos, music, television programs, games, etc. In some embodiments, media content can be stored on and loaded from a media content server. In some embodiments, media content can be stored on a user device in memory, or in some embodiments, can be loaded onto a user device using computer-readable media such as a DVD, a CD-ROM, a flash drive, etc.

Figure 1:
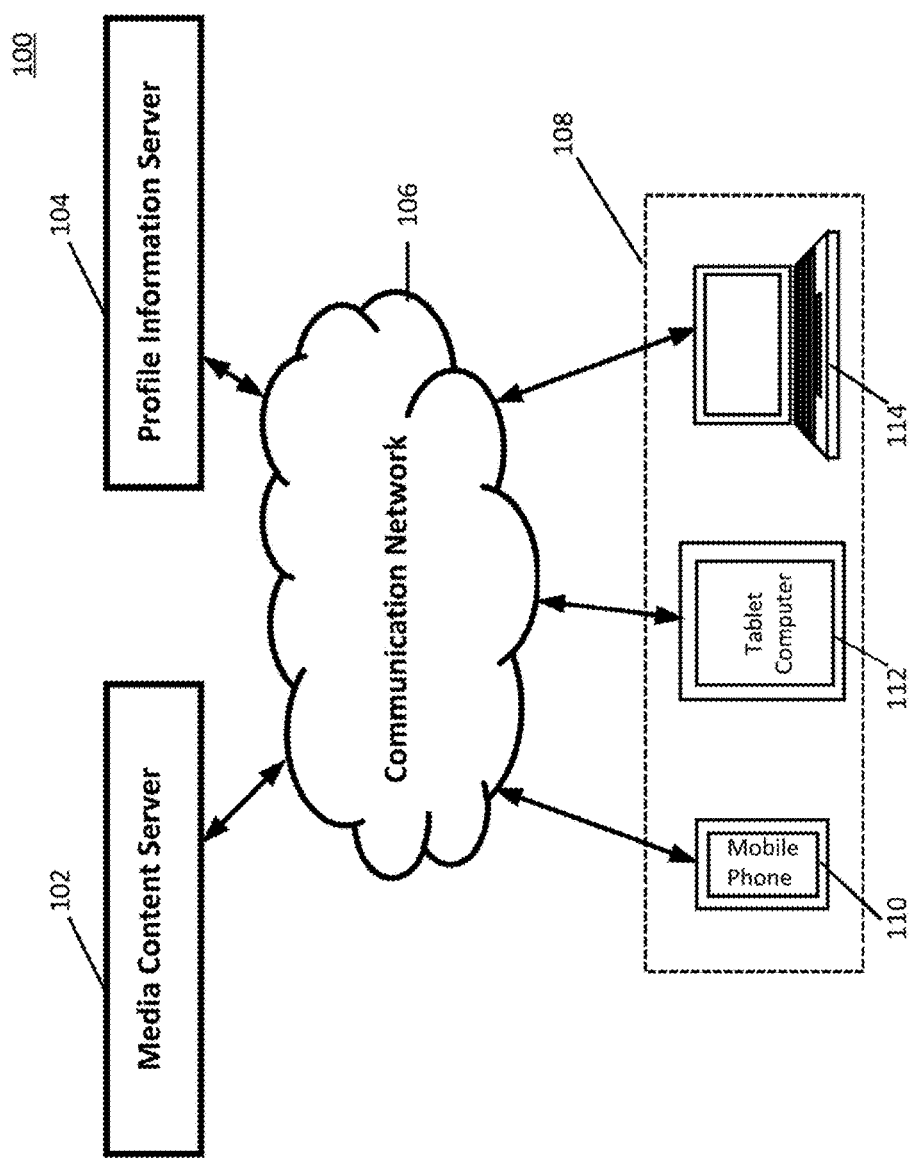
FIG. 1 shows a schematic diagram of hardware that can be used in accordance with some embodiments.

Turning to FIG. 1, an example 100 of hardware that can be used in accordance with some embodiments is shown. As illustrated, hardware 100 can include a media content server 102, a profile information server 104, a communication network 106, and one or more user devices 108, such as a mobile phone 110, a tablet computer 112, and/or a laptop computer 114.

Media content server 102 can be any suitable media content server for storing media content and for delivering the content to a user device 108 in some embodiments. For example, media content server 102 can be a server that streams media content to user device 108 via communication network 106. Media content provided by media content server 102 can be any suitable content such as video content, audio content, television programs, movies, cartoons, music, sound effects, audiobooks, streaming live content (e.g., a streaming radio show, a live concert, etc.), etc. In some embodiments, media content server 102 can be omitted. In some embodiments, media content can additionally or alternatively be delivered from memory on user device 108.

Profile information server 104 can be any suitable server for storing profile information and for delivering profile information to a user device 108 and/or a media content server 102 in some embodiments. In some embodiments, profile information server 104 can be omitted. In some embodiments, stored profiles can additionally or alternatively be stored in memory or storage of one or more user devices 108 and/or media content server 102.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User devices 108 can include any suitable one or more user devices for creating, modifying, saving, accessing, or using time-based controls during media content viewing. For example, in some embodiments, user devices 108 can include mobile devices, such as a mobile phone 110, a tablet computer 112, a laptop computer 114, a vehicle (e.g., car, boat, airplane, etc.) entertainment system, a portable media player, etc. Although not shown in FIG. 1, as another example, in some embodiments, user devices 108 can include non-mobile devices, such as a desktop computer, a set-top box, a smart television, a streaming media player, a game console, etc.

Although media content server 102 and profile information server 104 are illustrated as separate devices, these devices can be combined into one device in some embodiments. Also, although only one of each of media content server 102 and profile information server 104 is shown in FIG. 1 to avoid over-complicating the figure, any suitable one or more of each device can be used in some embodiments.

Although three user devices 110, 112, and 114 are shown in FIG. 1 to avoid over-complicating the figure, any suitable number (including none) of each of these devices, and any suitable types of these devices, can be used in some embodiments.

Figure 2:
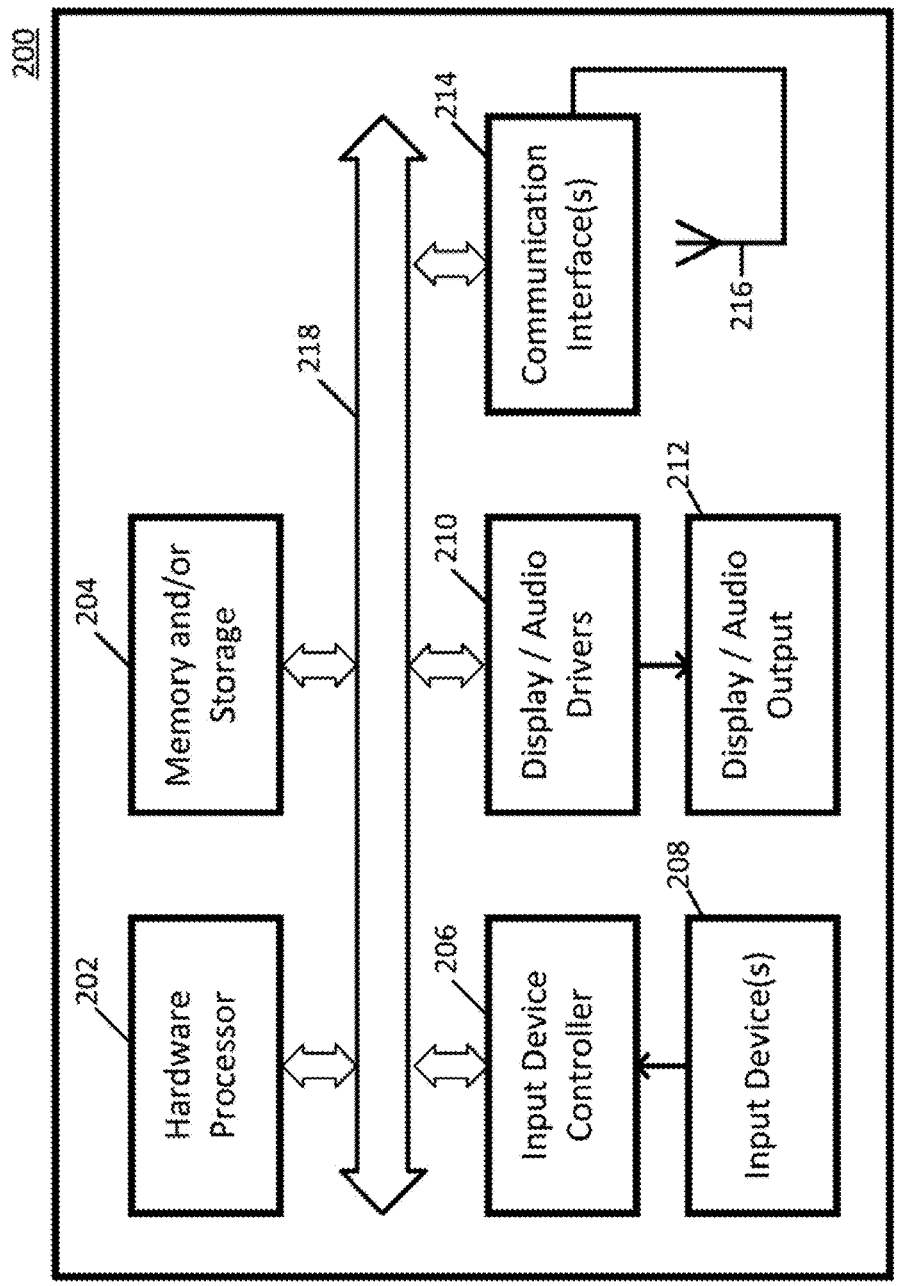
FIG. 2 shows an example of hardware that can be used in a server and/or a user device in accordance with some embodiments.

Media content server 102, profile information server 104, and user devices 108 can be implemented using any suitable hardware in some embodiments. For example, in some embodiments, devices 102, 104, and 108 can be implemented using any suitable general purpose computer or special purpose computer. For example, mobile phone 110 may be implemented using a special purpose computer. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, profiles, etc. in some embodiments. For example, memory and/or storage 204 can include random access memory, read-only memory, flash memory, hard disk storage, optical media, etc.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, etc.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, etc.

Communication interface(s) 214 can be any suitable circuitry for interfacing with one or more communication networks, such as network 106 as shown in FIG. 1. For example, interface(s) 214 can include network interface card circuitry, wireless communication circuitry, etc.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
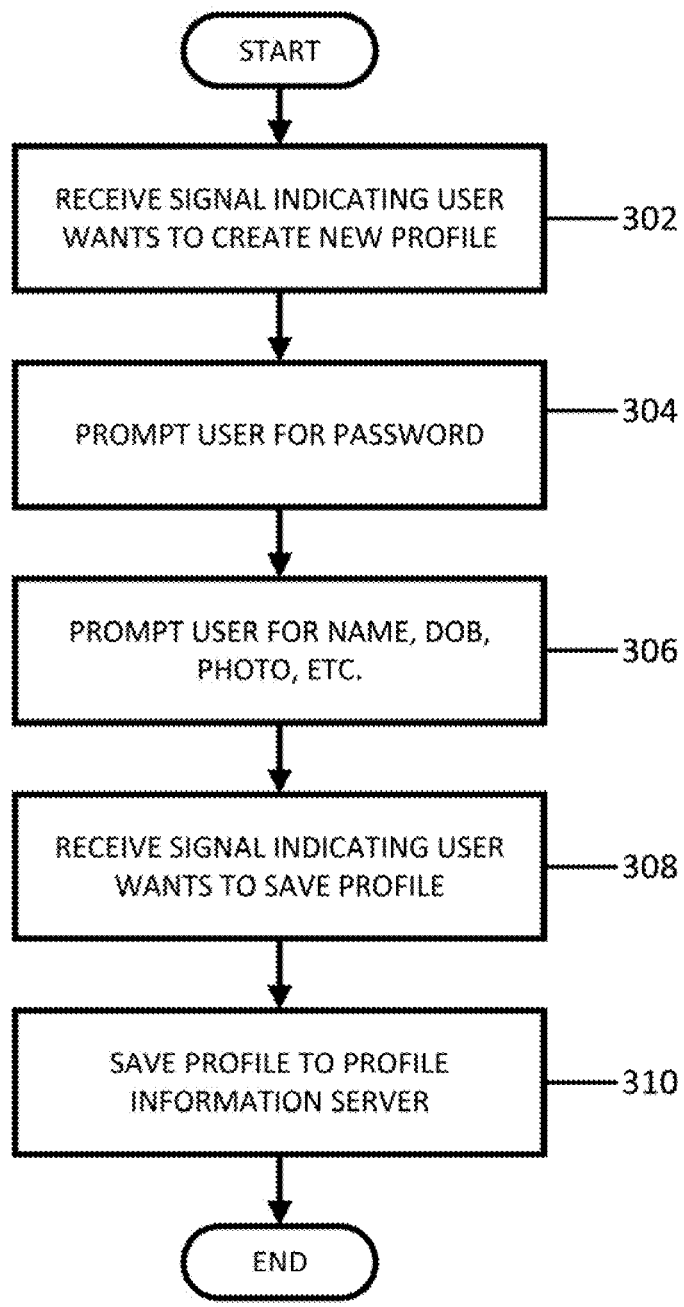
FIG. 3 is an example of a process for creating a new profile to store time control options in accordance with some embodiments.
Figure 4:
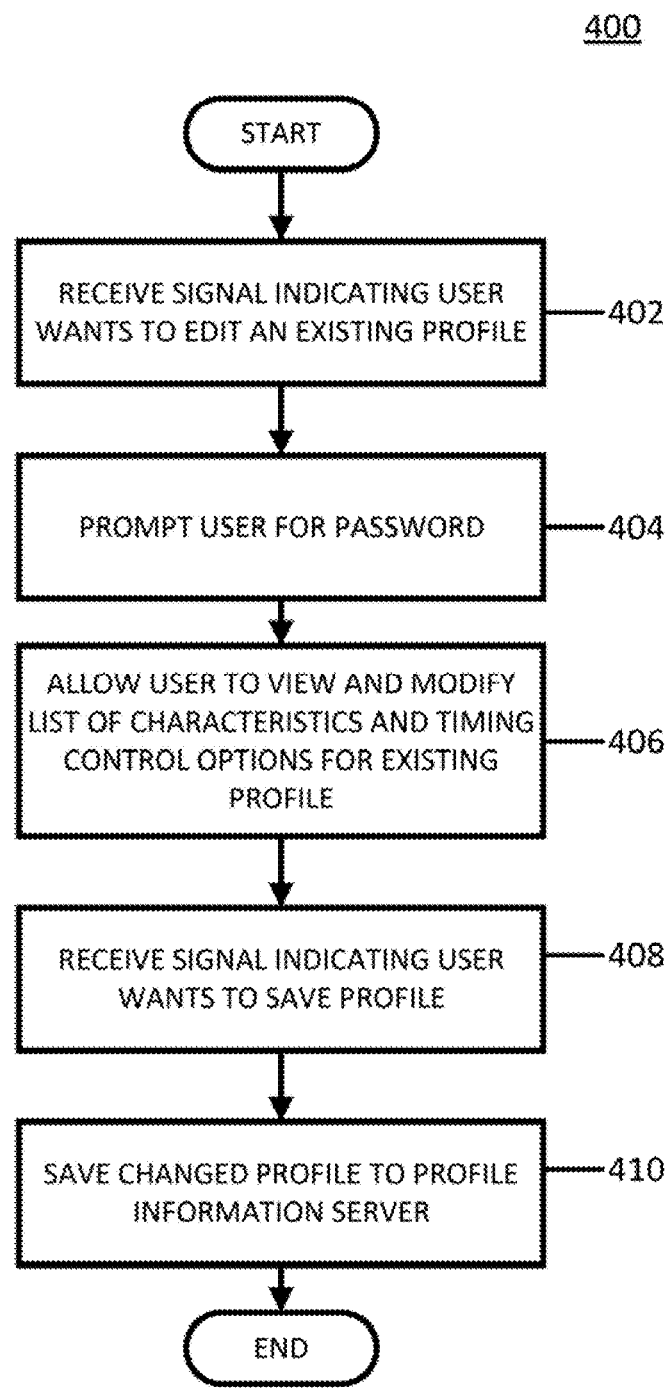
FIG. 4 is an example of a process for editing time control options within a stored profile in accordance with some embodiments.
Figure 5:
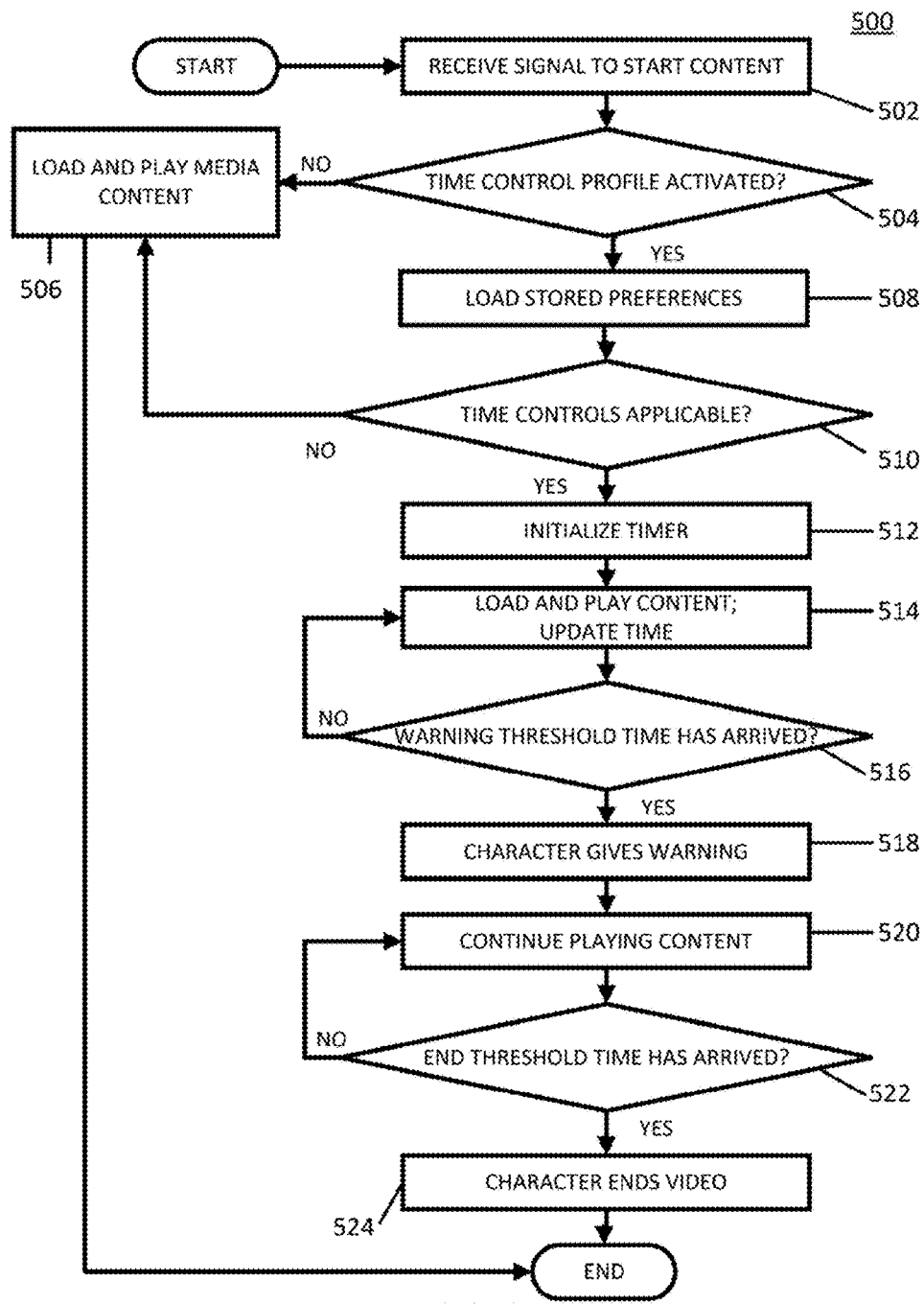
FIG. 5 is an example of a process for determining if and when time-based warnings should be delivered, delivering the warning, determining if and when time-based presentation of media content should be limited or stopped, and limiting or stopping presentation of media content in accordance with some embodiments.

FIGS. 3-5 show examples of processes for creating a profile, setting characteristics or time control options of a profile, modifying characteristics or time control options of a profile, saving a profile, using time-based warnings, and controlling time-based access to media content in accordance with some embodiments. The processes shown in FIGS. 3-5 can be executed with components of hardware 200. For example, in some embodiments, a process can poll an internal clock on hardware processor 202 to determine the amount of elapsed time since a presentation of media content began. As another example, in some embodiments, hardware processor 202 can request media content from media server 102 and can direct the storage of the received media content to a buffer in memory 204. As yet another example, hardware processor 202 can present media content by directing display/audio drivers 210 to present the media content to display/audio output 212.

FIGS. 6-10 show examples of user interfaces for creating a profile, setting characteristics or time control options of a profile, modifying characteristics or time control options of a profile, saving a profile, using time-based warnings, and controlling time-based access to media content in accordance with some embodiments. Display of and interaction with the user interfaces shown in and described in connection with FIGS. 6-10 can be executed with components of hardware 200. For example, in some embodiments, hardware processor 202 can cause a user interface to be presented on display/audio output 212 (e.g., a monitor, a tablet screen, speakers, etc.) by directing display/audio driver 210 to present the user interface on display/audio output 212. As another example, hardware processor 202 can receive input from a user interface by receiving data passed from input device controller 206, which can receive input from input device 208 (e.g., a keyboard, a mouse, a touch screen, a microphone, etc.)

Turning to FIG. 3, an example 300 of a process for creating and saving a new profile is illustrated. As shown, process 300 can begin by receiving a signal indicating that a user wants to create a new profile at 302. Such a signal can originate from any suitable mechanism allowing a user to indicate that the user wants to create a new profile. For example, in some embodiments, a signal can be generated by a hardware processor in response to the hardware processor determining that a user utilized a selection mechanism 622 on a menu panel 604 as shown in and described in connection with FIG. 6. As another example, in some embodiments, a signal can be generated by a hardware processor in response to the hardware processor detecting a spoken command from a user.

In some embodiments, process 300 can require a user to enter a password to create a new profile at 304. For example, a password entry field 612 and a button 614 can be used to allow a user to enter and submit a password as shown in and described in connection with FIG. 6. In some embodiments, the ability to create a new profile need not be password-restricted, and therefore block 304 can be omitted.

In some embodiments, process 300 can prompt a user to enter a name, date of birth, gender, and photo for the child associated with the profile at 306. In some embodiments, values and/or images for any field can initially be set to default or anonymized values such as name "Child 1" or a stock photo and kept with one or more of such values if desired by a user. Data values (e.g., name, date of birth, gender, photo, etc.) can be entered with any suitable method for allowing a user to input data to user device 108. For example, data can be entered using input device(s) 208 such as a keyboard, a mouse, a touchscreen, a microphone, etc.

Process 300 can receive a signal indicating that a user wants to save a newly created profile at 308. For example, in some embodiments, a signal can be generated by a hardware processor in response to a hardware processor detecting that a user clicked or tapped a save button. In some embodiments, block 308 can be omitted. In some such embodiments, a profile can be automatically saved after a suitable time has elapsed since a user initiated creation of a new profile.

Process 300 can save a newly created profile to profile information server 104 (as shown in and described in connection with FIG. 1) at 310. In some such embodiments, profile information can be sent from user device 108 to profile information server 104 using communication network 106. In some embodiments, process 300 can save a newly created profile to memory and/or storage on user device 108. In some embodiments, one or more parts of the profile information can be stored in a secure manner (e.g., in an encrypted form) to reduce the likelihood of unauthorized access to the underlying data.

Turning to FIG. 4, an example 400 of a process for editing an existing profile is illustrated. As shown, process 400 can begin by receiving a signal that a user wants to edit an existing profile at 402. For example, in some embodiments, a signal can be generated by a hardware processor in response to the hardware processor detecting that a user utilized a selection mechanism 610 as shown in and described in connection with FIG. 6.

In some embodiments, process 400 can require a user who wants to edit a profile to enter a password at 404. In other embodiments, the ability to edit a profile need not be password-restricted, and therefore block 404 can be omitted.

Process 400 can allow a user to modify characteristics of the person associated with the existing profile at 406. For example, as shown in and described in connection with FIG. 7, a list of characteristics 734 can be modified. In the specific example of FIG. 7, list 734 can include a name field 718, a date of birth field 730, a gender field 732, and a photo or icon 726. In some embodiments, at block 406, fields 718, 730, and 732 and photo 726 can be set to blank or default values.

Process 400 can also allow a user to set or modify time control options at 406. For example, as shown in and described in connection with FIG. 7, a list of time control options 736 can be modified. In the specific example of FIG. 7, list 736 can include a rule application field 740, an enforce time limit toggle 742, a time duration field 744, a frequency field 746, an allow search toggle 748, a show related content toggle 750, and a warning time field 752. At 406, in some embodiments, time limits can be turned on or off, for example, by turning toggle 742 on or off, therefore specifying that time limits should or should not be enforced. In some embodiments, the time duration allowed for media content viewing (e.g., 30 minutes) at a given frequency (e.g., once per day) associated with the existing profile can be specified, for example, by modifying field 744. In some embodiments, a time duration at which time a warning will be shown or given (e.g., "5 minutes left") can be specified, for example, by modifying field 752. In some embodiments, a frequency with which media content can be accessed (e.g., daily, twice per day, weekly, etc.) can be specified, for example, by modifying field 746. In some embodiments, a different time limit can be specified for different days of the week or times of the year. For example, a longer time limit (or no time limit) can be applied on weekends than on weekdays. As another example, a longer time limit (or no time limit) can be applied during summer months than during the school year. Additionally or alternatively, in some embodiments, a different time limit (or no time limit) can be applied when the requested media content is educational. In some such embodiments, different time limits can be set for different times or different types of media content by modifying rule application field 740.

Profile characteristics (e.g., name, date of birth, gender, photo, etc.) and time control options (e.g., time duration, frequency, toggles to allow searching or show related content, etc.) can be set or modified with any suitable method for allowing a user to input data to user device 108. For example, data can be entered using a keyboard, a mouse, a touchscreen, a microphone, etc.

Process 400 can receive a signal indicating that a user wants to save the profile at 408. For example, in some embodiments, the signal can be generated by a hardware processor in response to the hardware processor determining that a user clicked or tapped a save button 756 on user interface 700 as shown in and described in connection with FIG. 7. As another example, in some embodiments, process 400 can cause a hardware processor to generate a signal that audibly asks a user if the user wants to save a profile and can cause the hardware processor to recognize speech spoken into a microphone input device.

Process 400 can save a modified profile to profile information server 104 at 410. In some embodiments, data to be saved (e.g., a profile) can be sent to profile information server 104 from user device 108 through communication network 106. In some embodiments, a modified profile can be saved in memory and/or storage on user device 108. As described above, one or more parts of the profile can be stored in a secure manner.

Turning to FIG. 5, an example 500 of a process for determining if time controls are applicable, displaying indicators of the amount of time remaining for viewing media content, issuing a warning when a time limit is approaching, and limiting or stopping a presentation of media content once a time limit is reached is illustrated in accordance with some embodiments.

Process 500 can receive a signal to begin playing media content at 502. A signal can be any suitable mechanism for allowing a user to indicate that the user wants to begin viewing media content. For example, a signal can be generated by a hardware processor in response to the hardware processor determining that a user clicked or tapped a video or clicked or tapped a "Play" button. As another example, a signal can be generated by a hardware processor in response to the hardware processor determining that a user audibly instructed a user device 108 through a microphone to begin playing media content (e.g., by saying "Play dinosaur video").

Process 500 can determine whether a time control profile is currently activated at 504. A decision can be made by any suitable mechanism for checking the current state of stored profiles. For example, in some embodiments, which profile is activated, if any, can be stored on profile information server 104, and process 500 can access this information through communication network 106. As another example, in some embodiments, which profile is activated, if any, can be stored in memory 204 on user device 108, and process 500 can access this information using hardware processor 202 at block 504.

If, at 504, it is determined that no time control profile has been activated, process 500 can load and begin presenting media content at 506. Requested media content can be loaded with any suitable technique. For example, in response to a request for media content, the media content can be sent from media content server 102 to user device 108 through communication network 106 using communication interface(s) 214 and/or antenna 216. Additionally or alternatively, part or all of the media content may be stored in memory 204 (e.g., in a buffer). Media content can be presented using any suitable technique. For example, in some embodiments, hardware processor 202 can direct display/audio drivers 210 to present the media content via display/audio output 212. In some such embodiments, the requested media content can be stored in memory/storage 204.

If, at 504, it is determined that a time control profile has been activated, process 500 can load the stored time control options associated with the activated profile at 508. In some embodiments, process 500 can access the current time control options stored on profile information server 104 through communication network 106. In some embodiments, process 500 can access the current time control options stored in memory 204 on user device 108.

If a time control profile has been activated, process 500 can determine if the specified time control options are applicable to the currently requested media content at 510. For example, the time control options associated with the activated profile may indicate that time limits should only apply on weekdays, whereas the current day is a weekend day. As another example, the time control options associated with the activated profile may indicate that time limits should only apply to non-educational videos, and the requested media content has been determined to be an educational video. Process 500 can determine if the time control options specified in the current profile are applicable by comparing the time control options (e.g., list 736) to the current situation using any suitable technique. For example, in some embodiments, hardware processor 202 can access an internal clock and calendar on user device 108 and compare the time and date to the parameters of the profile to determine whether the time controls are applicable.

If, at 510, process 500 determines that the time control options are not applicable to the current media content or situation, process 500 can loop back to 506 and can load and begin presenting the requested media content.

If, at 510, process 500 determines that the time control options are applicable to the current media content or situation, process 500 can initialize a timer measuring elapsed time of a presentation of media content at 512 using any suitable technique. For example, in some embodiments, hardware processor 202 can set a variable, which can store the duration of elapsed time of a presentation of media content and can be stored in memory 204, to zero. In some embodiments, process 500 can create and display (at 512) a time icon 808 as shown in and described in connection with FIG. 8.

Process 500 can load media content and present the media content while monitoring elapsed time and updating indicators of elapsed time at 514. Similarly to block 506, hardware processor 202 can present media content to display/audio output 212 as described above. In some embodiments, the elapsed time of a presentation of media content can be monitored by hardware processor 202. For example, in some embodiments, hardware processor 202 can execute a routine which can periodically (e.g., every 0.01 seconds, every 0.1 seconds, etc.) poll an internal clock in hardware processor 202 and can store the time in a variable stored in memory 204. In some such embodiments, the variable can be the same as the variable initialized in block 512, as described above. In some embodiments, the indicators of elapsed time can include an icon 810, another icon 812, and a written indicator 814, as shown in and described in connection with FIG. 8. Process 500 can update elapsed time icons/indicators 810, 812, and 814 at any suitable frequency (e.g., every 0.1 seconds, every 0.5 seconds, every 1 minute, etc.). In some embodiments, icons/indicators 810, 812, and 814 can each be updated at different frequencies.

An elapsed time at which a warning should be given that a presentation of media content will soon be limited or stopped can be specified. As a specific example, a user can indicate in field 752, as shown in and described in connection with FIG. 7, that a warning should be given when 5 minutes of viewing time remain.

Process 500 can determine at 516 if the specified time duration (referred to as a "warning threshold time") has elapsed, and therefore, that a warning should be given. Block 516 can be implemented with any mechanism of checking if the warning threshold time has been met. For example, block 516 can include a routine which periodically (e.g., every 0.01 seconds, every 0.1 second, etc.) checks the duration of elapsed time since presentation of media content began and signals when the warning threshold time has been met.

In some embodiments, block 516 can be implemented to determine that the warning threshold time has been met when media content is first measured to have been presented for a duration of time greater than or equal to the warning threshold time. Additionally or alternatively, in some embodiments, block 516 can be implemented to determine that the warning threshold time has been met when media content is measured to have been presented for a time duration that is less than the warning threshold time by an acceptable value (e.g., 0.1 seconds, 0.5 seconds, etc.). In some embodiments, it can be specified in user interface 700 that no warning should be given. In some such embodiments, block 516 can be omitted.

If, at 516, it is determined that the warning threshold time has not been met, process 500 can continue presenting media content at 514 and can update timing indicators 810, 812, and 814 as shown in and described in connection with FIG. 8.

If, at 516, it is determined that the warning threshold time has been met, process 500 can issue a warning at 518. The warning issued at 518 can include a character 916, a message 918, an updated icon 910, another updated icon 912, and an updated indicator 914 as shown in and described in connection with FIG. 9. In some embodiments, hardware processor 202 can pause presentation of media content while the image, video and/or sound associated with the warning is presented. Additionally or alternately, in some embodiments, a timer measuring elapsed time during media content presentation can be paused while the warning is issued.

Process 500 can continue playing media content at 520. Similarly to blocks 506 and 514, hardware processor 202 can continue presenting media content to display/audio output 212 as described above.

Process 500 can determine at 522 if a specified time limit (referred to as "end threshold time") has elapsed. As a specific example, a user can specify in time duration field 744, as shown in and described in connection with FIG. 7, that the time limit for media content viewing is 30 minutes. In this specific example, the end threshold time is 30 minutes, and a presentation of media content can be limited or stopped when the end threshold time has been met. Similarly to block 516, block 522 can be implemented with any mechanism of checking if the end threshold time has been met. Similarly to block 516, 522 can be implemented to determine that the end threshold time has been met when the elapsed time is first measured to be greater than or equal to the end threshold time. In some embodiments, similarly to 516, block 522 can be implemented to determine that the end threshold time has been met when the elapsed time is less than the specified time limit by an acceptable value.

If, at 522, it is determined that the end threshold time has not been met, process 500 can continue playing media content and can update indicators of the elapsed time of the media content presentation at 520. In some embodiments, the indicators can include icons 910, 912, and 914 as shown in and described in connection with FIG. 9.

If, at 522, it is determined that the end threshold time has been met, process 500 can limit or stop presenting media content at 524. In some embodiments, hardware processor 202 can limit or stop presenting media content to display/audio output 212 by directing display/audio drivers 210 to stop presenting media content via display/audio output 212 and clear any media content which is queued for presentation.

Figure 6:
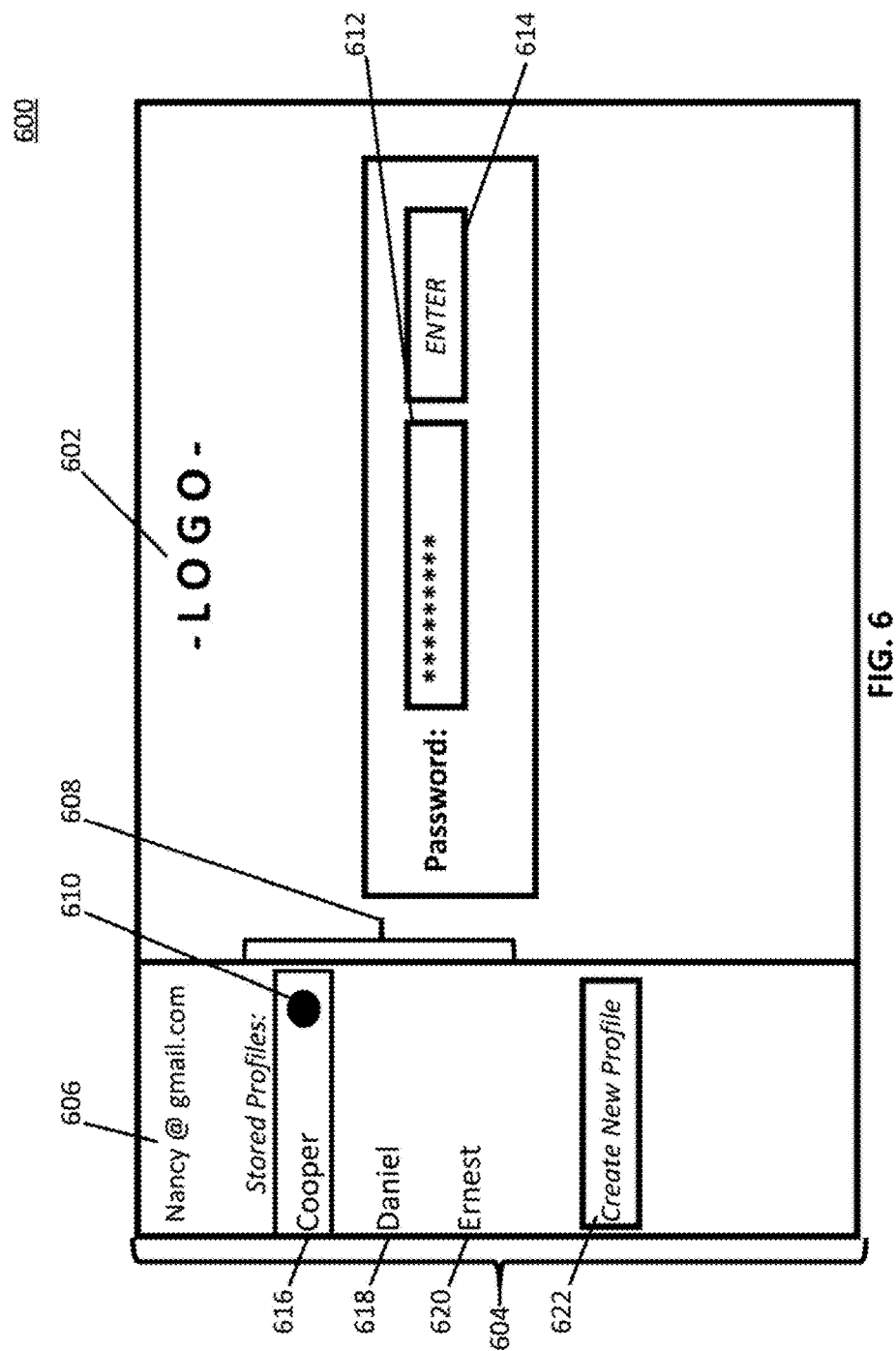
FIG. 6 is an example of a user interface for presenting media content with time-based warnings and time-based access control to media content, wherein the ability to edit time control options is password-protected, in accordance with some embodiments.

Turning to FIG. 6, an example 600 of a user interface for creating, modifying and/or saving time controls in accordance with some embodiments is illustrated. As shown, in some embodiments, user interface 600 can include a provider logo 602, menu panel 604, and a list of stored profiles 608.

Logo 602 can be any suitable logo of any suitable provider of user interface 600 and can include any suitable text, graphics, images, video, etc. in accordance with some embodiments.

Menu panel 604 can be any suitable interface for accessing various menu options, such as a list of options, a collection of images that can be selected, etc. In some embodiments, menu panel 604 can be fixed at a location on user interface 600. In some embodiments, menu panel 604 can be hidden until a user indicates that the user wants to interact with menu panel 604. In some embodiments, menu panel 604 can be omitted.

In some embodiments, menu panel 604 can include a user indicator 606. User indicator 606 can be any suitable indicator of the identity of the current user, such as a name, an email address, a photo, etc. In some embodiments, user indicator 606 can be omitted.

List of profiles 608 can indicate the currently stored profiles that a user has created and saved, such as profiles 616, 618 and 620 as shown in FIG. 6. List of profiles 608 can include any suitable collection of indicators which differentiate the various stored profiles from each other. For example, in some embodiments, list of profiles 608 can include the real names of a user's children. In other embodiments, list 608 can include anonymized names, such as "Child 1," "Child 2," etc. List 608 can additionally or alternatively include any other suitable text, graphics, photos, etc. in accordance with some embodiments.

A specific profile can be selected to be edited via a selection mechanism 610. Selection mechanism 610 can be any suitable method of selecting an already-stored profile, such as a hyperlink, check box, radio button, etc. In some embodiments, selection mechanism 610 might not be visible on user interface 600. For example, in some embodiments, a stored profile can be selected by touching, clicking, or otherwise selecting a name or an icon associated with that profile on a touch-screen display. As another example, in some embodiments, a stored profile can be selected by verbally stating a name associated with that profile into a microphone connected to the user device.

A new profile can be created via selection mechanism 622. Selection mechanism 622 can be any suitable method for allowing a user to indicate that the user wants to create a new profile. For example, as shown in FIG. 6, selection mechanism 622 can be a push button on menu panel 604. As another example, in some embodiments, selection mechanism 622 can be an image with a stock photo of a person. In some embodiments, selection mechanism 622 might not be visible on user interface 600. For example, in some embodiments, creation of a new profile can be initiated by touching or clicking menu panel 604. As another example, in some embodiments, creation of a new profile can be initiated by verbally stating a phrase (e.g., "Create new profile") into a microphone connected to user device 108.

As stated above, in some embodiments, the ability to view or edit stored profile information can be restricted by requiring a user to enter a password, for example, as described above in connection with block 304 in FIG. 3. In some such embodiments, once a profile is selected for viewing or editing, a window containing password entry field 612 can be opened. Password entry field 612 can be any suitable field for entering a password. For example, as shown in FIG. 6, field 612 can be a text entry box for receiving typed text. As another example, field 612 can be a window for entering hand-written text. In some embodiments, the password can include a non-text code, such as a fingerprint scan. In some such embodiments, field 612 can include a window on the display to scan a user's fingerprint. The window can also include button 614. Button 614 can be any suitable mechanism for receiving an indication from a user that the user has entered their password and wants to continue.

Figure 7:
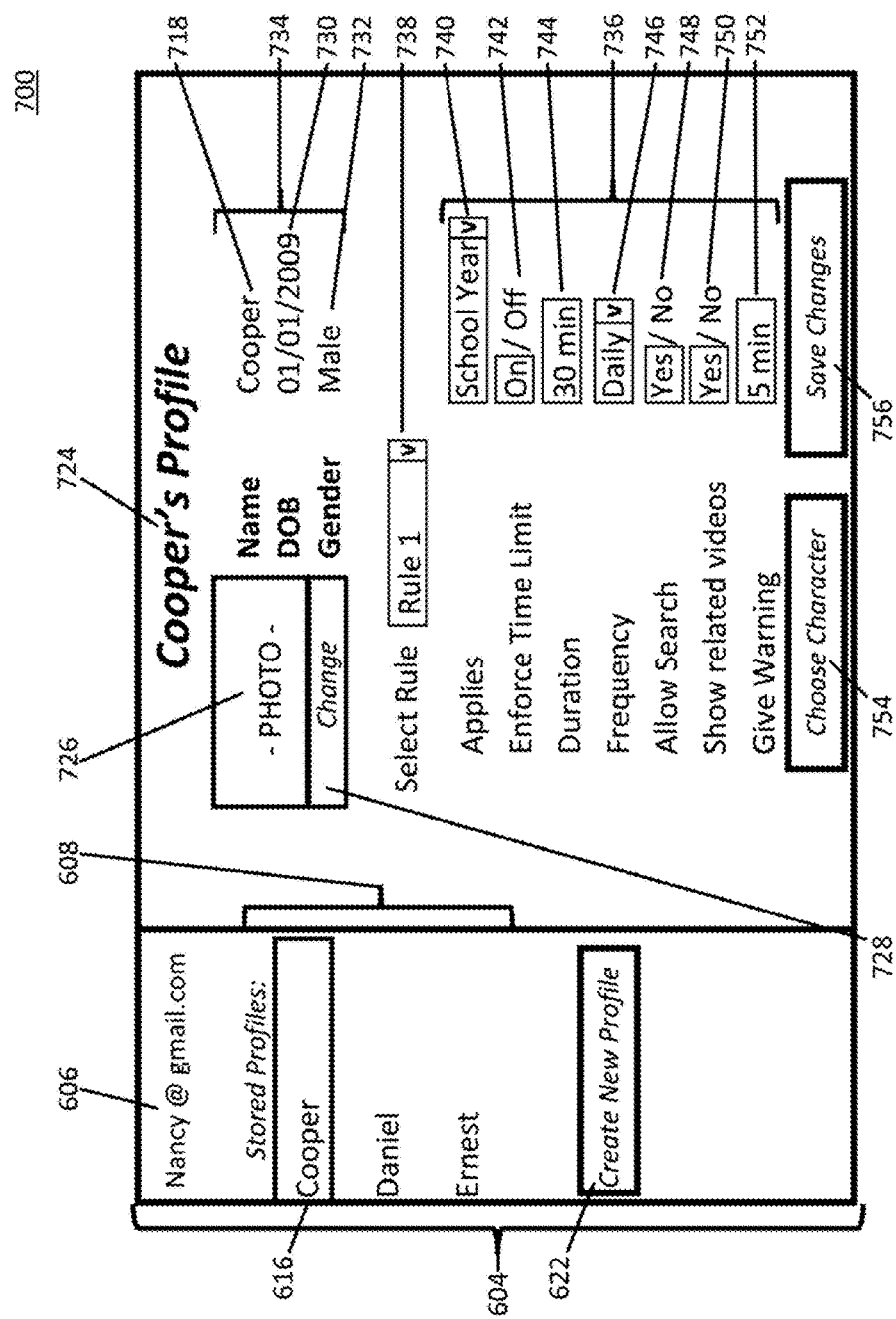
FIG. 7 is an example of a user interface to set and modify time control options in accordance with some embodiments.

Turning to FIG. 7, an example 700 of a user interface for setting and modifying characteristics associated with a profile is shown, in accordance with some embodiments. As shown, in some embodiments, user interface 700 can include list 734 of characteristics associated with a stored profile which can be set or modified by a user. As shown, in some embodiments, list 734 of characteristics can include name field 718, date of birth field 730, gender field 732, and photo or icon 726 associated with the profile.

In some embodiments, a name associated with a selected profile can be changed in field 718. In some embodiments, a name entered in field 718 can be changed to an anonymized name, such as "Child 1," "Child 2," etc. In some embodiments, the name shown in list 608 and the name shown in a text block 724 can be correspondingly changed.

In some embodiments, the date of birth of the child associated with a selected profile can be changed in field 730. In some embodiments, field 730 can be used to set default age-appropriate time limits or default age-appropriate characters. In some embodiments, field 730 can be left blank or can be deleted for privacy.

In some embodiments, the gender of the child associated with a selected profile can be changed in field 732. In some embodiments, gender field 732 can be left blank or can be deleted for privacy.

In some embodiments, photo or icon 726 can be changed. For example, photo or icon 726 can be changed via a button 728, where button 728 can be any suitable mechanism for receiving an indication from a user that the user wants to change photo or icon 726. In other embodiments, button 728 can be omitted. For example, in some such embodiments, photo or icon 726 can be changed by tapping or clicking the current photo or icon. In some embodiments, photo or icon 726 can be other media content, such as an animation. In some embodiments, photo or icon 726 can be omitted or left blank for privacy.

User interface 700 can include a list of time control options which can be set or modified in accordance with some embodiments. As a particular example, as shown in user interface 700 and as described above in connection with FIG. 4, list 736 can include a rule application field 740, an on/off toggle to apply time limits 742, a time limit duration field 744, a viewing frequency field 746, an on/off toggle to allow searching for media content 748, an on/off toggle to allow related content to be suggested 750, and a time for warning field 752.

Toggle to apply time limits 742 can be used to select whether or not time limits should be applied to media content viewed under the profile being edited. Toggle 742 can be any suitable mechanism for allowing a user to choose one of two options. For example, toggle 742 can be radio buttons to select either "on" or "off". As another example, toggle 742 can be a slider with two options, "on" and "off". In some embodiments, toggle 742 can be omitted.

Time limit duration field 744 can be used to enter a time duration allowed for media content viewing. Field 744 can be any suitable mechanism for entering a time limit. For example, as shown in FIG. 7, field 744 can be a text entry box for receiving typed text. As another example, field 744 can be a slider ranging from 0 minutes to some maximum number of minutes, which can be adjusted by a user on a continuous scale. As yet another example, field 744 can be a drop-down menu with a pre-set selection of time limits available as options.

Viewing frequency field 746 can be used to set an allowable media content viewing frequency. For example, as shown in FIG. 7, viewing frequency can be set to "Daily," indicating that time controls should apply every day. Field 746 can be any suitable mechanism for specifying a frequency. For example, as shown in FIG. 7, field 746 can be a drop-down menu with a pre-set selection of frequencies available as options. In some embodiments, field 746 can be omitted.

Toggle to allow searching 748 and toggle to allow suggestions of related media 750 can allow a user to control the degree of freedom a child is allowed in accessing media content. For example, by setting toggle 748 to "no," a child can be restricted to viewing only media content that is directly accessed. Similarly, by setting toggle 750 to "no," a child can be restricted from seeing suggestions of media that were classified as similar to the originally accessed media content. Similarly to toggle 742, toggles 748 and 750 can be any suitable method of selecting one of two options, such as radio buttons, drop-down menus, sliders, etc. In some embodiments, toggles 748 and 750 can be omitted.

Time for warning field 752 can be used to enter a time at which a warning will be given that presentation of media content will soon be limited or stopped. For example, as shown in field 752 in FIG. 7, a warning can be given when 5 minutes of viewing time remain. Field 752 can be any suitable mechanism for entering a time. For example, as shown in FIG. 7, field 752 can be a text entry box for receiving typed text. As another example, field 752 can be a drop-down menu with a pre-set selection of time limits available as options.

In some embodiments, a warning that a presentation of media content will be limited or stopped soon can be delivered by a character. In some embodiments, the character can be selected by a selection mechanism 754. Selection mechanism 754 can be any suitable method of allowing a user to indicate that the user wants to change the character associated with a profile, such as a text hyperlink, button, etc. In some embodiments, selection mechanism 754 might not be visible on user interface 700. For example, in some embodiments, the current character associated with the profile can be shown as an image, animation, etc., which can be tapped or clicked to indicate that the user wants to change the character. In some embodiments, selection mechanism 754 can be omitted.

In some embodiments, different time control options (e.g., time limit duration, time limit for warning, allowing search, etc.) can be applied for different times (e.g., school year, summer vacation, weekends, nighttime, etc.) or for different media content (e.g., educational, non-educational, etc.). In some such embodiments, the time or the type of media content which time control options should apply to can be specified with rule application field 740. Rule application field 740 can be any suitable mechanism for allowing a user to specify the time or the type of media content the time control options should apply to. For example, as shown in FIG. 7, rule application field 740 can include a drop-down menu with a selection of options (e.g., "School Year," "Summer," "After 7 p.m.," "Educational Videos," etc.). In some embodiments, rule application field 740 can be omitted.

In some embodiments, list of time control options 736 can be grouped as a "rule." In some such embodiments, a rule can be named, for example, "Rule 1". In some such embodiments, the name of the rule can be specified in a rule name field 738. In some embodiments, a profile can include more than one rule. For example, as shown in FIG. 7, "Rule 1" can specify time control options (e.g., 30 minute time limit, allow searching, etc.) that should apply during the school year (as set in rule application field 740). The same profile can include a "Rule 2" (not shown) which can specify a different time limit which should apply, for example, during the summer. Rule field 738 can be any suitable mechanism for allowing a user to enter a rule name or select a rule from a list of existing options. For example, as shown in FIG. 7, rule field 738 can be a drop-down menu with a selection of existing options. In some embodiments, rule name field 738 can be omitted.

Figure 8:
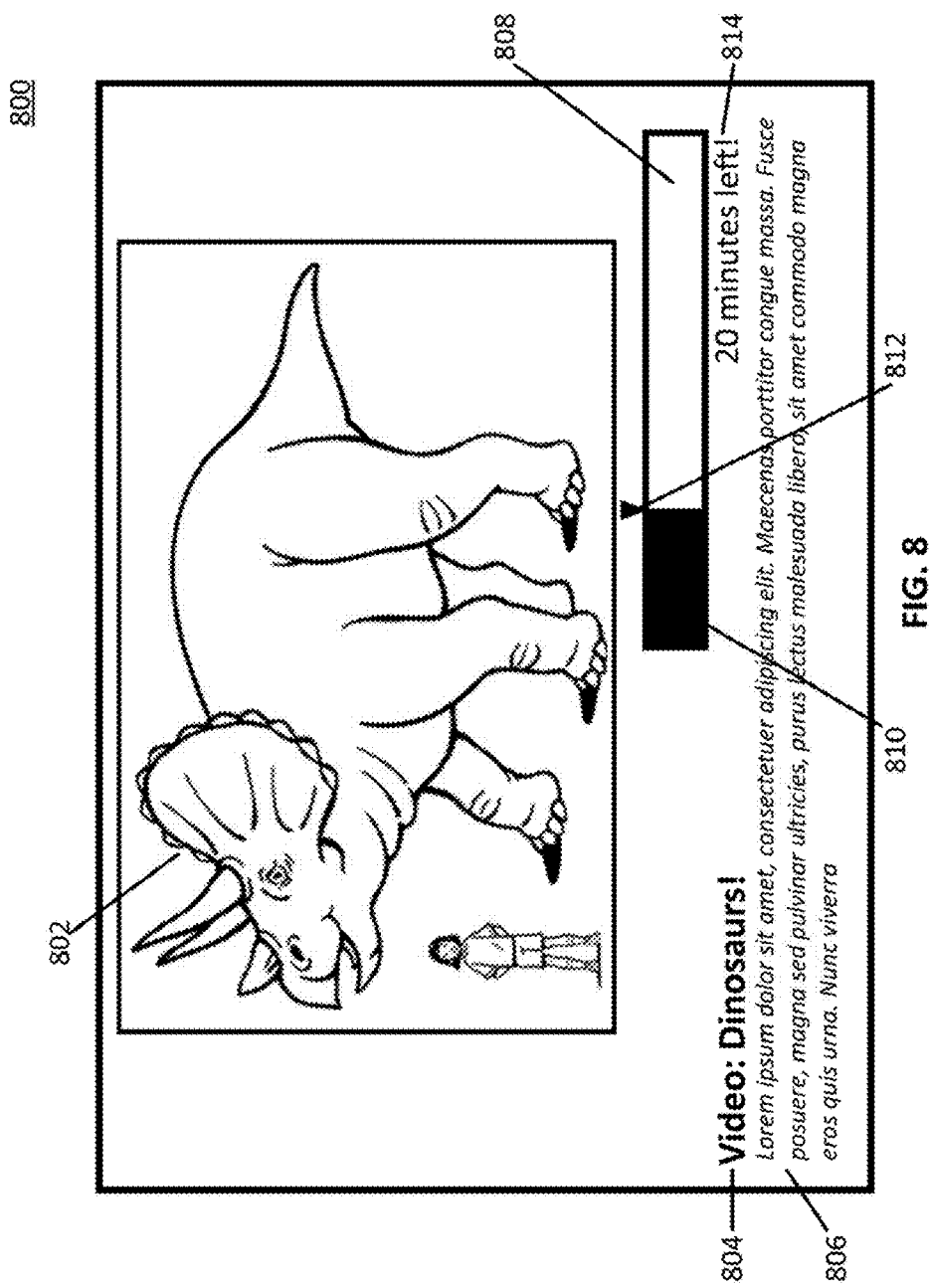
FIG. 8 is an example of a user interface for presenting media content with indicators of how much time has elapsed since a presentation of media content began in accordance with some embodiments.

Turning to FIG. 8, an example 800 of a user interface for displaying the amount of time remaining for media content viewing is shown, in accordance with some embodiments. User interface 800 can include an instance of media content 802, a title 804 for media content 802, and a description 806 of media content 802. Additionally, as described above in connection with FIG. 5, user interface 800 can include icon 808, which indicates the total time allowed for viewing the media content, icons 810 and 812, which indicate the amount of time elapsed since media content presentation began, and written indicator 814 which indicates the amount of time remaining for viewing the media content.

As described above, media content 802 can be any suitable media requested by a user. For example, as illustrated in FIG. 8, media content 802 can be a video. As another example, in some embodiments, media content 802 can be an audio program, either pre-recorded (e.g., an audiobook), or a live streaming program (e.g., a live radio program).

Title 804 can be any suitable mechanism for indicating the title of media content 802. For example, as shown in FIG. 8, title 804 can include a text block indicating a title for media content 802. As another example, in some embodiments, title 804 can include a logo indicating the creator of media content 802. In some embodiments, title 804 can be omitted.

Description 806 can be any suitable description of media content 802. For example, in some embodiments, description 806 can include a block of written text describing the content of the video, the history of its production, the number of views it has received, etc. In some embodiments, description 806 can include a non-written description, such as pictures or graphics illustrating or relating to media content 802. In some embodiments, description 806 can be fixed at a location on user interface 800. In some embodiments, description 806 can be hidden until a user indicates that the user wants to see description 806 (for example, by tapping or clicking user interface 800). In some embodiments, description 806 can include non-visual information. For example, description 806 can include an audio description which can be played when a user clicks or taps user interface 800. In some embodiments, description 806 can be omitted.

Icon 808 can indicate the total time allowed for viewing media content 802. Icon 808 can be any suitable mechanism for indicating the total time allowed, for example, as set in field 744 as shown in and described in connection with FIG. 7. For example, as shown in FIG. 8, icon 808 can include a bar, where the length of the bar can indicate the total time duration allowed for viewing the media content. As another example, icon 808 can include an hourglass (not shown), where the amount of sand in the hourglass can indicate the total time duration allowed for viewing. In some embodiments, icon 808 can be omitted.

Icon 810 can indicate the amount of time elapsed since presentation of media content 802 began. Icon 810 can be any suitable mechanism for indicating the amount of time elapsed. For example, as shown in FIG. 8, icon 810 can include a bar superimposed on icon 808, where the length of the bar in icon 810 indicates the amount of time elapsed. In some embodiments, icon 810 can be omitted.

Icon 812 can also indicate the amount of time elapsed since presentation of media content 802 began. Icon 812 can be any suitable mechanism for indicating the amount of time elapsed. For example, as shown in FIG. 8, icon 812 can include an inverted triangle, where a vertex can indicate the rightmost edge of icon 810. As another example, icon 812 can include a child-friendly image (e.g., a turtle, a monkey, a car, etc.) whose location can indicate the amount of time elapsed. In some embodiments, icon 812 can be omitted.

Indicator 814 can indicate the amount of time remaining for viewing media content 802. For example, as shown in FIG. 8, indicator 814 can state the amount of time remaining by displaying text on user interface 800. In some embodiments, indicator 814 can state the amount of time that has elapsed since media content 802 began playing. In some embodiments, indicator 814 can be omitted.

Figure 9:
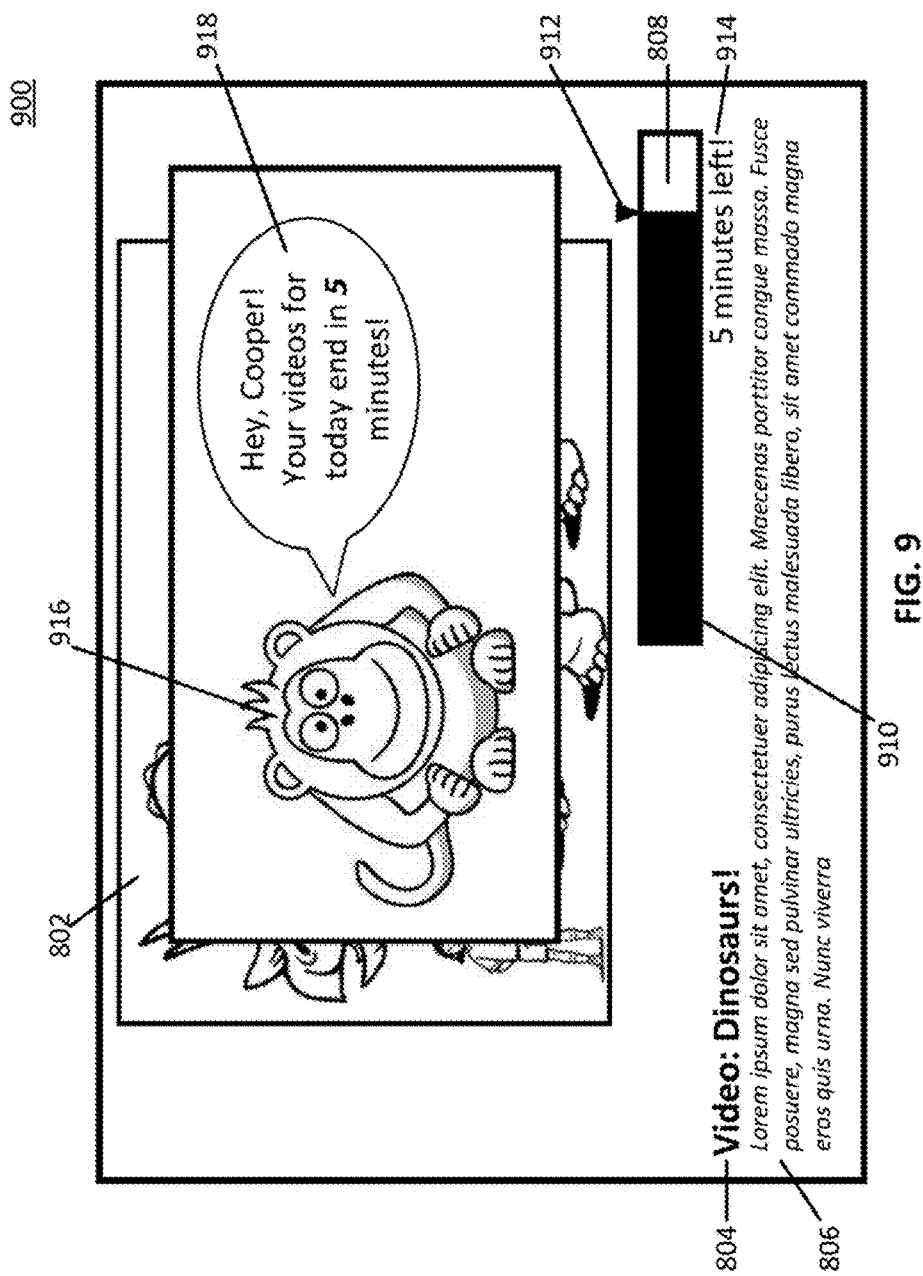
FIG. 9 is an example of a user interface for delivering a time-based warning that a presentation of media content will be limited or stopped soon in accordance with some embodiments.

Turning to FIG. 9, an example 900 of a user interface in which a time-based warning is issued is illustrated in accordance with some embodiments. As described above in connection with FIG. 5, in some embodiments, user interface 900 can include updated icons 910 and 912 which can indicate the amount of time elapsed since presentation of media content 802 began, updated written indicator 914 which can indicate the amount of time remaining for viewing media content 802, child-friendly character 916, and warning 918.

Icons 910 and 912 can be similar to icons 810 and 812 in user interface 800 and can be updated in user interface 900 to indicate the time currently remaining for viewing media content 802. Similarly, written indicator 914 can be similar to indicator 814 in user interface 800. In some embodiments, icons 910 and 912 and indicator 914 can be omitted.

Character 916 can be any suitable image, photo, graphical icon, animation or video suitable for delivering a time-based warning. For example, as shown in FIG. 9, character 916 can include an image of a child-friendly character. As another example, character 916 can include a video or animation of a popular character. In some embodiments, character 916 can include a character appealing specifically to the child associated with an activated profile. For example, a talking car can be chosen for a child who enjoys automobiles, or a monkey for a child who enjoys animals. In some embodiments, different characters can be chosen for each profile in list 608. In some such embodiments, a character can be selected with selection mechanism 754 as shown in and described in connection with FIG. 7.

Warning 918 can be any suitable time-based warning delivered to a viewer of media content 802. For example, as shown in FIG. 9, warning 918 can include a written message indicating the amount of time remaining. Additionally or alternatively, in some embodiments, warning 918 can include an audio warning, for example, a character stating the time remaining verbally. Additionally or alternatively, warning 918 can include non-language communication (e.g., a whistle, horn, haptic feedback, etc.). In some embodiments, hardware processor 202 can deliver warning 918 by directing display/audio drivers 210 to present the image, animation, video, sounds, haptic feedback, etc. associated with the warning to display/audio output 212.

Figure 10:
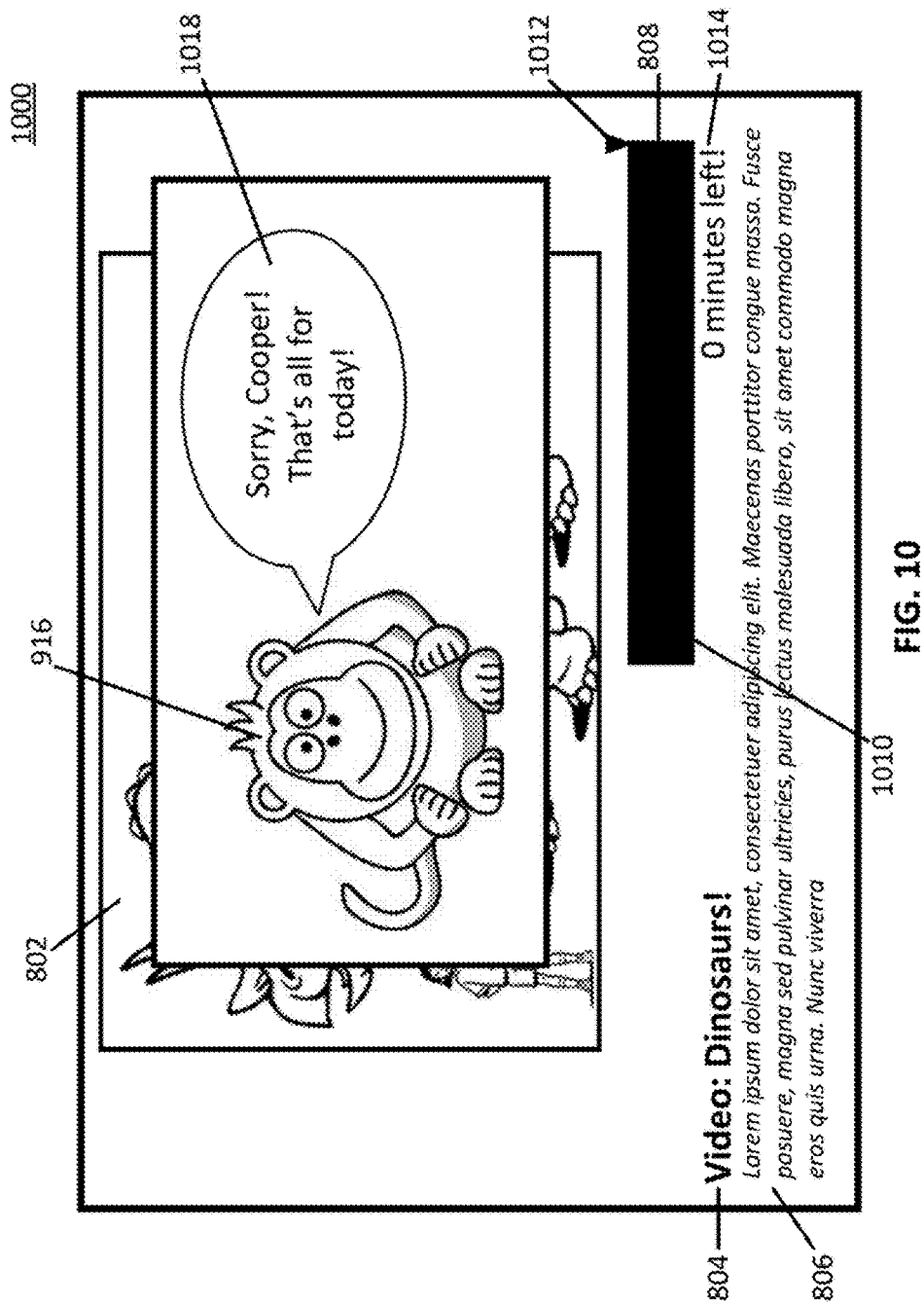
FIG. 10 is an example of a user interface for alerting a viewer that a specified time period has elapsed in its entirety and that the presentation of media content has therefore been limited or stopped in accordance with some embodiments.

Turning to FIG. 10, an example 1000 of a user interface in which presentation of media content is limited or stopped based on a specified time limit is illustrated in accordance with some embodiments. User interface 1000 can include an icon 1010 and an icon 1012 indicating that the allotted time has completely elapsed, an indicator 1014 indicating that zero minutes of media content viewing time remain, and a message 1018 stating that the allotted time is over.

Icon 1010 and icon 1012 can include any suitable mechanism for indicating that the allotted time for viewing media content 802 has elapsed in its entirety. For example, as shown in FIG. 10, icon 1010 can include a bar which completely covers icon 808 and icon 1012 can include a triangle whose tip points to the right-most edge of icon 808. Indicator 1014 can be any suitable mechanism for stating that the allotted time has completely elapsed. For example, as shown in FIG. 10, indicator 1014 can include a line of text stating that zero minutes remain. In some embodiments, any one or more of icons 1010, 1012 and indicator 1014 can be omitted.

Message 1018 can include any suitable mechanism for telling a viewer of media content 802 that the time allotted for viewing media content 802 is over. For example, as shown in FIG. 10, message 1018 can include a written message displayed on user interface 1000. As another example, message 1018 can include an audio message, for example, a verbal statement by a character that the allotted time is over. Additionally or alternatively, message 1018 can include a non-language tone (e.g., a horn, whistle, etc.) or haptic feedback (e.g., vibration of a user device). Hardware processor 202 can present message 1018 similarly to warning 918, as described in connection with FIG. 9.

It should be understood that at least some of the above described blocks of the processes of FIGS. 3-5 can be executed or performed in any order or sequence not limited to the order and sequence shown and described in the figures. Also, some of the above blocks of the processes of FIGS. 3-5 can be executed or performed substantially simultaneously where appropriate or in parallel to reduce latency and processing times.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for controlling media content presentation, the method comprising:

receiving, at a first time point via a user interface on a user device, control information including a first threshold of time, a second threshold of time, a third threshold of time, and an identifier of a selected character;

transmitting the control information and instructions from the user device to a server, wherein the instructions cause the first threshold of time, the second threshold of time, and the identifier of the selected character to be stored in connection with a first rule on the server and cause the first threshold of time, the third threshold of time, and the identifier of the selected character to be stored in connection with a second rule on the server;

causing, at a second time point, media content to be presented on the user device;

in response to causing the media content to be presented on the user device at the second time point, retrieving, by the user device, the control information from the server;

selecting, based on a characteristic of the second time point, the first rule, wherein selecting the first rule comprises selecting the second threshold of time;

determining, using a hardware processor, whether the first threshold and the second threshold of the control information are applicable to media content that is being presented based on a type of media content of the media content that is being presented and based on the second time point;

in response to determining that the first threshold and the second threshold are applicable to the presentation of the media content based on the media content being a first type of media content from a plurality of media content types, determining an elapsed time of the presentation of the media content;

generating an animated warning that the presentation will soon end that includes an audio message that is provided by the selected character in response to the elapsed time meeting the first threshold; and causing a computing device to present the animated warning that the presentation will soon end using the selected character and cause an audio output of the computing device to present audio content corresponding to the audio message, wherein the selected character is animated to provide the audio message in response to the elapsed time meeting the first threshold and causing the computing device to cease the presentation of the media content in response to the elapsed time meeting the second threshold.

2. The method of claim 1, wherein the determination of whether the first threshold and the second threshold of the control information are applicable to the media content that is being presented in based on a characteristic of the current point in time.

3. The method of claim 1, further comprising:
receiving, via the user interface, an indication that the selected character is to be changed to another character; and
receiving, via the user interface, an identifier of a second character, wherein the warning that the presentation will soon end is presented using the second character.

4. The method of claim 3, further comprising causing a plurality of characters to be presented in the user interface for selection, wherein at least a portion of the characters are identified as being child-friendly characters.

5. The method of claim 1, further comprising causing an indication of the elapsed time of the presentation of the media content to be presented, wherein the indication includes the character indicating the elapsed time.

6. The method of claim 1, further comprising causing a notification indicating that the elapsed time has met the second threshold to be presented in connection with ending the presentation of the media content.

7. The method of claim 6, wherein the notification indicating that the elapsed time has met the second threshold is presented with an animation of the character providing the notification.

8. A system for controlling media content presentation, the system comprising:
a memory storing computer-executable instructions; and
a hardware processor that, when executing the computer-executable instructions stored in the memory, is configured to:
receive, at a first time point via a user interface on a user device, control information including a first threshold of time, a second threshold of time, a third threshold of time, and an identifier of a selected character;

transmit the control information and instructions from the user device to a server, wherein the instructions cause the first threshold of time, the second threshold of time, and the identifier of the selected character to be stored in connection with a first rule on the server and cause the first threshold of time, the third threshold of time, and the identifier of the selected character to be stored in connection with a second rule on the server;

cause, at a second time point, media content to be presented on the user device;

in response to causing the media content to be presented on the user device at the second time point, retrieve, by the user device, the control information from the server;

select, based on a characteristic of the second time point, the first rule, wherein selecting the first rule comprises selecting the second threshold of time;

determine whether the first threshold and the second threshold of the control information are applicable to media content that is being presented based on a type of media content of the media content that is being presented and based on the second time point;

in response to determining that the first threshold and the second threshold are applicable to the presentation of the media content based on the media content being a first type of media content from a plurality of media content types, determine an elapsed time of the presentation of the media content;

generate an animated warning that the presentation will soon end that includes an audio message that is provided by the selected character in response to the elapsed time meeting the first threshold; and cause a computing device to present the animated warning that the presentation will soon end using the selected character and cause an audio output of the computing device to present audio content corresponding to the audio message, wherein the selected character is animated to provide the audio message in response to the elapsed time meeting the first threshold and cause the computing device to cease the presentation of the media content in response to the elapsed time meeting the second threshold.

9. The system of claim 8, wherein the determination of whether the first threshold and the second threshold of the control information are applicable to the media content that is being presented in based on a characteristic of the current point in time.

10. The system of claim 8, wherein the hardware processor is further configured to:
receive, via the user interface, an indication that the selected character is to be changed to another character; and
receive, via the user interface, an identifier of a second character, wherein the warning that the presentation will soon end is presented using the second character.

11. The system of claim 10, wherein the hardware processor is further configured to cause a plurality of characters to be presented in the user interface for selection, wherein at least a portion of the characters are identified as being child-friendly characters.

12. The system of claim 8, wherein the hardware processor is further configured to cause an indication of the elapsed time of the presentation of the media content to be presented, wherein the indication includes the character indicating the elapsed time.

13. The system of claim 8, wherein the hardware processor is further configured to cause a notification indicating that the elapsed time has met the second threshold to be presented in connection with ending the presentation of the media content.

14. The system of claim 13, wherein the notification indicating that the elapsed time has met the second threshold is presented with an animation of the character providing the notification.

15. A non-transitory computer-readable medium containing computer executable instructions that, when executed by a processor, cause the processor to perform a method for controlling media content presentation, the method comprising:
receiving, at a first time point via a user interface on a user device, control information including a first threshold of time, a second threshold of time, a third threshold of time, and an identifier of a selected character;
transmitting the control information and instructions from the user device to a server, wherein the instructions cause the first threshold of time, the second threshold of time, and the identifier of the selected character to be stored in connection with a first rule on the server and cause the first threshold of time, the third threshold of time, and the identifier of the selected character to be stored in connection with a second rule on the server;
causing, at a second time point, media content to be presented on the user device;
in response to causing the media content to be presented on the user device at the second time point, retrieving, by the user device, the control information from the server;
selecting, based on a characteristic of the second time point, the first rule, wherein selecting the first rule comprises selecting the second threshold of time;
determining whether the first threshold and the second threshold of the control information are applicable to media content that is being presented based on a type of media content of the media content that is being presented and based on the second time point;
in response to determining that the first threshold and the second threshold are applicable to the presentation of the media content based on the media content being a first type of media content from a plurality of media content types, determining an elapsed time of the presentation of the media content;
generating an animated warning that the presentation will soon end that includes an audio message that is provided by the selected character in response to the elapsed time meeting the first threshold; and
causing a computing device to present the animated warning that the presentation will soon end using the selected character and cause an audio output of the computing device to present audio content corresponding to the audio message, wherein the selected character is animated to provide the audio message in response to the elapsed time meeting the first threshold and causing the computing device to cease the presentation of the media content in response to the elapsed time meeting the second threshold.

16. The non-transitory computer-readable medium of claim 15, wherein the determination of whether the first threshold and the second threshold of the control information are applicable to the media content that is being presented in based on a characteristic of the current point in time.

17. The non-transitory computer-readable medium of claim 15, wherein the method further comprises:
receiving, via the user interface, an indication that the selected character is to be changed to another character; and
receiving, via the user interface, an identifier of a second character, wherein the warning that the presentation will soon end is presented using the second character.

18. The non-transitory computer-readable medium of claim 17, wherein the method further comprises causing a plurality of characters to be presented in the user interface for selection, wherein at least a portion of the characters are identified as being child-friendly characters.

19. The non-transitory computer-readable medium of claim 15, wherein the method further comprises causing an indication of the elapsed time of the presentation of the media content to be presented, wherein the indication includes the character indicating the elapsed time.

20. The non-transitory computer-readable medium of claim 15, wherein the method further comprises causing a notification indicating that the elapsed time has met the second threshold to be presented in connection with ending the presentation of the media content.

21. The non-transitory computer-readable medium of claim 20, wherein the notification indicating that the elapsed time has met the second threshold is presented with an animation of the character providing the notification.

* * * * *